ABSTRACT OF THE DISCLOSURE

A method for producing uricase from yeast which comprises adapting a yeast of Candida utilis to uric acid by growth of the same in a medium containing uric acid as the nitrogen source, freezing said adapted yeast and then thawing it, then subjecting the thawed yeast to autodigestion by adding thereto a phosphate buffer solution or potassium or sodium phosphate dibasic salt solution of a pH of at least 6.5 and leaving the mixture to stand at a temperature of 15° to 35°C and finally extracting uricase from said mixture.

---

This invention relates to a method for producing uricase, an enzyme which is effective in the treatment of gout caused by uric acid metabolic disorder and which is also used for determining both blood and urine uric acid, said method—briefly stated—comprising adapting a Candida utilis (Torula utilis) yeast to a uric acid culture medium and extracting uricase from its cells.

Uricase has so far been produced by extraction from such internal organs of animals as kidneys of cows and livers of pigs but the animal organs are so hard to acquire in quantity as enzyme supply sources that mass production of uricase has not been possible.

I have succeeded in industrially producing uricase from yeast of the Candida utilis genus which is a yeast which is comparatively easily available and can be mass-treated. That is to say, according to the present invention, Candida utilis cultivated in advance is adapted to uric acid in a culture medium containing uric acid so that uricase may be produced, the cells are frozen and subsequently thawed, then a phosphate buffer solution or sodium phosphate dibasic ($Na_2HPO_4$) solution of a pH of 7.0 to 9.15 is added to the cells, the cells are left to stand to effect self-digestion and then uricase is extracted. Separation of the cells is effected by centrifugal precipitation or filtration and uricase is collected from the supernatant liquid by salting out with ammonium sulfate.

In carrying out the present invention, any yeast of the Candida utilis or Torula utilis genus may be used. Strains of Candida utilis are obtainable in any public culture collected, such as ATCC (American Type Culture Collection, Rockville, Md.).

The cultivation of the yeast is conducted in a manner well known per se in the art of cultivation of Candida utilis or Torula utilis yeasts. Thus, for example, a medium containing carbon source such as glucose, cane sugar, molasses, waste sulfite pulp liquor, corn steep liquor or the like, and nitrogen source such as amino acid(s), ammonium sulfate, ammonium chloride, ammonia, urea or the like, or a synthetic medium, may be used. The cultivation is preferably conducted at a pH of about 6 and at a temperature of 25 to 30° C. under aerobic conditions. The time required for the cultivation is usually about 30 to 72 hours. As is usual, the medium may also contain a small amount of minerals such as magnesium sulfate, potassium phosphate dibasic salt ($K_2HPO_4$), etc.

After the cultivtaion, the cells are separated and collected from the culture. This can be done in any suitable and per se conventional manner such as centrifugal separation or filtration, followed by washing with water.

The yeast so cultivated is then adapted to uric acid. This adaptation can be conducted by treating the yeast cells with an aqueous medium which can be the same as that employed in the previous cultivation of the yeast but which must contain uric acid as a source of nitrogen. The adaptation cultivation conditions can also be the same as those of the initial yeast cultivation. The time for the adaptation treatment or cultivation can be shorter, e.g. 120 to 300 minutes.

The yeast thus adapted to uric acid can be frozen to enable storage for a prolonged period of time. The temperature can be any one which is lower than that at which the wet yeast cells freeze. Thus, the yeast cells are frozen at a temperature of about −10° C. or below.

The frozen yeast cells can be used at any desired time for the extraction of uricase. For the extraction, the frozen yeast is thawed, and has added thereto a suitable extracting medium which, preferably, is a phosphate buffer solution or potassium (or sodium) phosphate dibasic salt solution. The solution should be of a pH of 6.5 or higher, preferably 7.0 to 9.15, and then the concentration should be ½ to ½ mol. The mixture is then left to stand at a temperature of 15–35° C., preferably at about 25° C. for a sufficient time to effect autodigestion of the yeast and extraction of uricase.

Then, the mixture is filtered or centrifuged to separate extract from waste cells. Uricase is separated from the extract and, if desired, is purified in any per se known manner such as salting out, dialysis or freeze-drying. Thus, for example, ammonium sulfate is added to the uricase extract to 0.3 saturation to precipitate impurities, which are removed by filtration. The filtrate then has further ammonium sulfate added thereto to precipitate uricase, which is collected and subjected to dialysis. The dialyzed liquid is freeze-dried to obtain uricase powder.

The present invention is further elaborated with reference to the following illustrative example, wherein percentages are by weight.

Example

Candida utilis 6020 (available at Osaka University, Osaka, Japan) was inoculated into a synthetic aqueous culture medium of pH of 6.5 containing 5% glucose, 25% asparagine, 1% potassium phosphate dibasic salt, 3% magnesium sulfate and 4% ammonium sulfate and was cultivated at 25° C. for 3 days. Then its cells were collected by centrifugal precipitation, were washed with pure water and were then shaken in 100 milliliters of uric acid adapted aqueous culture medium containing 4 grams of glucose, 100 milligrams of potassium phosphate dibasic salt, 200 milligrams of magnesium sulfate and 10 milligrams of uric acid per gram of the cells as wet for about 4 hours so as to be adapted to uric acid. The adapting time, the uric acid decomposifiion action (uricase activity) of the cells and the variation of the specific activity of the extracted uricase for the corresponding time are shown in Table 1. It was found that the proper adapting time was 120 to 300 minutes or preferably 180 to 240 minutes.

TABLE 1

| | Adapting time (in minutes) | | | | |
|---|---|---|---|---|---|
| | 60 | 120 | 180 | 240 | 300 |
| Uricase activity in percent | 58 | 83 | 90 | 100 | 90 |
| Specific activity in percent | 53 | 87 | 100 | 93 | 80 |

5 liters of M/10 phosphate buffer solution of pH 8.0 were added to 1 kilogram as wet of uric acid adapted Candida utilis stored at −20° C. and the mixture was left at 25° C. for about 16 hours so as to self-digest. Then the cells were separated by centrifugal precipitation and were then washed with cold water. When the supernatent liquor was collected, 8.5 liters of a uricase extract [of a uricase activity of 0.34 unit/ml., total activity of 2900 units and specific activity (activity per $E_{cm.}^{280}=1$) of 0.035] were obtained.

The relation between the extracting (self-digesting) time and the uricase activity was as in Table 2. The maximum extraction rate was achieved at about 16 hours.

TABLE 2

|  | Extraction time (in hours) | | | | |
|---|---|---|---|---|---|
|  | 4 | 8 | 16 | 24 | 48 |
| Uricase activity in percent | 30 | 68 | 100 | 72 | 26 |

Then the extract was fractionally salted out with ammonium sulfate so as to be 0.3 to 0.8 saturated and was dialyzed with a cellophane membrane. When the dialyzed liquid was frozen and dried, 16.333 grams of a uricase powder (of a uricase activity of 0.155 unit/mg. and total activity of 2530 units) were obtained.

In the above explanation, the unit of uricase activity is that activity which converts uric acid to allantoin at the rate of 1μ mol per minute in borate buffer solution of pH 8.5 at 25° C.

The strain of *Candida utilis* employed in the foregoing example can be replaced with like results by any other strain of *Candida utilis*, as e.g. a strain obtainable from ATCC or any other culture collection.

What I claim is:

1. A method for extracting uricase from a uric acid-adapted yeast of *Candida utilis* characterized in that said adapted yeast is first subjected to freezing and then thawing, the thawed yeast is subjected to autodigestion by adding thereto a phosphate buffer solution or potassium or sodium phosphate dibasic salt solution of a pH of at least 6.5 and leaving the mixture to stand at a temperature of 15° to 35° C. and finally extracting uricase from said mixture.

2. A method as in claim 1 wherein the autodigestion is conducted at a pH of 7.0 to 9.15 for 8 to 24 hours.

References Cited

Roush et al.: Science 124, 125–126 (1956).

Quetsch et al.: Journal of Cellular and Comparative Physiology 64, 115–121.

Methods in Enzymology, vol. I, 51–52 (1955).

LIONEL M. SHAPIRO, Primary Examiner